(12) United States Patent
Jakimov et al.

(10) Patent No.: US 10,821,510 B2
(45) Date of Patent: Nov. 3, 2020

(54) METHOD AND DEVICE FOR ADDITIVELY MANUFACTURING AT LEAST ONE COMPONENT REGION OF A COMPONENT

(71) Applicants: MTU Aero Engines AG, Munich (DE); EOS GmbH Electro Optical Systems, Krailling (DE)

(72) Inventors: Andreas Jakimov, Munich (DE); Georg Schlick, Munich (DE); Herbert Hanrieder, Hohenkammer (DE); Martin Leuterer, Olching (DE)

(73) Assignees: MTU Aero Engines AG, Munich (DE); EOS GmbH Electro Optical Systems, Krailling (DE)

( * ) Notice: Subject to any disclaimer, the term of this patent is extended or adjusted under 35 U.S.C. 154(b) by 635 days.

(21) Appl. No.: 15/037,835

(22) PCT Filed: Jun. 6, 2014

(86) PCT No.: PCT/EP2014/061877
§ 371 (c)(1),
(2) Date: May 19, 2016

(87) PCT Pub. No.: WO2015/078595
PCT Pub. Date: Jun. 4, 2015

(65) Prior Publication Data
US 2016/0288209 A1 Oct. 6, 2016

(30) Foreign Application Priority Data
Nov. 27, 2013 (DE) .................. 10 2013 224 319

(51) Int. Cl.
B33Y 10/00 (2015.01)
B22F 3/105 (2006.01)
(Continued)

(52) U.S. Cl.
CPC ............ *B22F 3/1055* (2013.01); *B22F 5/009* (2013.01); *B23K 15/002* (2013.01);
(Continued)

(58) Field of Classification Search
CPC ......... B33Y 10/00; B33Y 30/00; B33Y 80/00; B23K 26/342; B23K 15/0086;
(Continued)

(56) References Cited

U.S. PATENT DOCUMENTS 4,778,971 A * 10/1988 Sakimoto ................. C21D 9/60
219/645
4,863,538 A * 9/1989 Deckard ................ B33Y 10/00
264/497

(Continued)

FOREIGN PATENT DOCUMENTS

CN 1976800 A 6/2007
CN 101835554 9/2010
(Continued)

OTHER PUBLICATIONS

English Translation of (DE102009051479A1)'s claims (Year: 2009).*
(Continued)

*Primary Examiner* — Tu B Hoang
*Assistant Examiner* — Tiffany T Tran
(74) *Attorney, Agent, or Firm* — Barlow, Josephs & Holmes, Ltd.

(57) ABSTRACT

The invention relates to a method and an associated device, the method including at least the following steps: applying a layer of powder to a component platform in the region of a building and joining area; locally melting and/or sintering the powder layer, wherein, in the region of the building and joining area, at least one high-energy beam is moved in relation to the component platform, selectively impinging the powder layer, at least part of which at least one high- (Continued)

Figure 1:
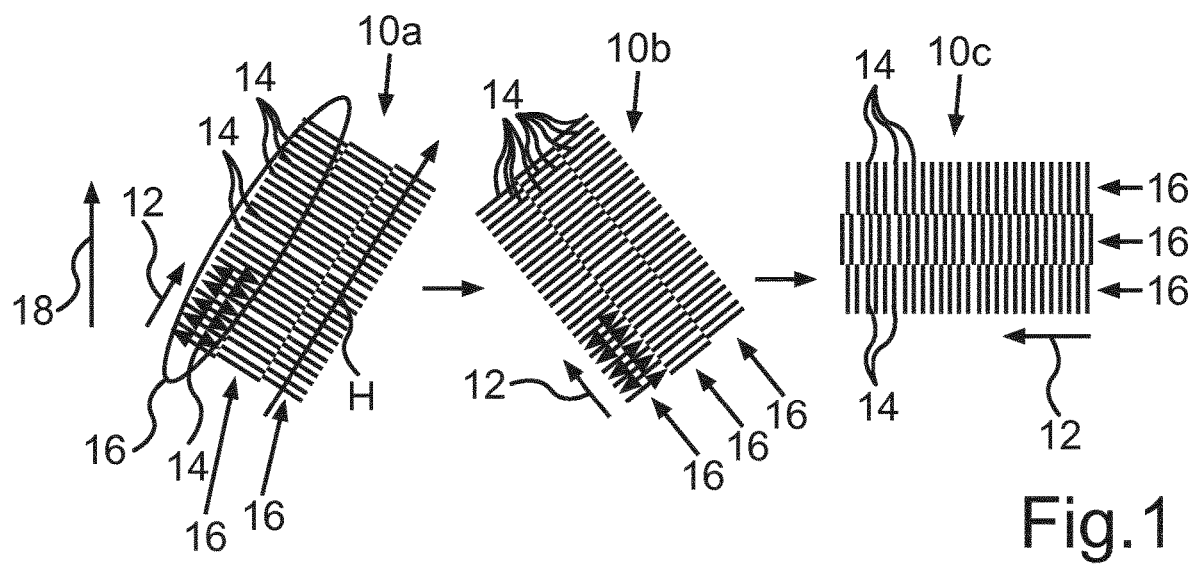

energy beam and the component platform are moved in relation to one another, in the form of a parallel arrangement arranged along a linear feed direction; lowering the component platform by a predetermined layer thickness in a lowering direction; and repeating the above-mentioned steps until the component region is completed.

7 Claims, 1 Drawing Sheet

(51) Int. Cl.

| | |
|---|---|
| *B22F 5/00* | (2006.01) |
| *B33Y 30/00* | (2015.01) |
| *B23K 26/342* | (2014.01) |
| *B23K 26/70* | (2014.01) |
| *B23K 15/00* | (2006.01) |
| *B23K 26/08* | (2014.01) |
| *B23K 101/00* | (2006.01) |
| *B23P 6/00* | (2006.01) |
| *B33Y 80/00* | (2015.01) |
| *B22F 5/04* | (2006.01) |

(52) U.S. Cl.
CPC ........ *B23K 15/0086* (2013.01); *B23K 26/083* (2013.01); *B23K 26/0876* (2013.01); *B23K 26/342* (2015.10); *B23K 26/702* (2015.10); *B33Y 10/00* (2014.12); *B33Y 30/00* (2014.12); *B22F 5/04* (2013.01); *B22F 2003/1056* (2013.01); *B22F 2202/07* (2013.01); *B22F 2203/11* (2013.01); *B22F 2998/10* (2013.01); *B23K 2101/001* (2018.08); *B23P 6/007* (2013.01); *B33Y 80/00* (2014.12); *Y02P 10/295* (2015.11)

(58) Field of Classification Search
CPC .............. B23K 26/083; B23K 26/0876; B23K 26/702; B23K 15/002; B23K 2101/001; B22F 3/1055; B22F 5/04; B22F 5/009; B22F 2998/10; B22F 2003/1056; Y02P 10/295; B23P 6/007
USPC ............................................ 219/635, 121.85
See application file for complete search history.

(56) References Cited

U.S. PATENT DOCUMENTS

| | | | | |
|---|---|---|---|---|
| 5,155,324 | A | * 10/1992 | Deckard | ................. B22F 3/004 |
| | | | | 264/497 |
| 8,034,279 | B2 | * 10/2011 | Dimter | .................. B22F 3/1055 |
| | | | | 264/113 |
| 10,144,062 | B2 | * 12/2018 | Bayer | .................... B22F 3/1055 |
| 2006/0145381 | A1 | * 7/2006 | Larsson | ................. B29C 64/153 |
| | | | | 264/40.6 |
| 2008/0241392 | A1 | 10/2008 | Dimter et al. | |
| 2009/0183850 | A1 | * 7/2009 | Morrison | ................. B22F 5/009 |
| | | | | 164/91 |
| 2013/0163967 | A1 | * 6/2013 | Lukin | ................... C23C 14/243 |
| | | | | 392/389 |
| 2016/0001509 | A1 | * 1/2016 | Long | .................. B23K 15/0086 |
| | | | | 700/98 |
| 2017/0106593 | A1 | * 4/2017 | Khairallah | ............ B29C 64/273 |

FOREIGN PATENT DOCUMENTS

| | | |
|---|---|---|
| CN | 102143813 A | 8/2011 |
| CN | 102553484 A | 7/2012 |
| DE | 102007014683 A1 | 10/2008 |
| DE | 102009051479 A1 | 5/2011 |
| DE | 102012206122 A1 | 10/2013 |
| EP | 2772329 A1 | 9/2014 |
| WO | 2013041195 A2 | 3/2013 |

OTHER PUBLICATIONS

CN101835554 (Year: 2008).*
Scanning patterns for selective laser melting, Inside Metal Additive Manufacturing, Jan. 30, 2015.
Part and material properties in selective laser melting of metals, J.-P. Kruth, et al., The 16th International Symposium on Electromachining (ISEM—XVI), CIRP Sponsored Conference, Apr. 19-23, 2010, Shanghai, China.
Developer of Selective Laser Melting Looks toward New Applications for the Generative Manufacturing Process, European Tool & Mould Making, May 2010.
Development of Processing Strategies for the Additive Layer Manufacture of Aeropspace Components in Inconel 718, Robert James Deffley, Department of Materials Science and Engineering, The University of Sheffield, pp. 95-96, Jan. 2012.

* cited by examiner

US 10,821,510 B2

METHOD AND DEVICE FOR ADDITIVELY MANUFACTURING AT LEAST ONE COMPONENT REGION OF A COMPONENT

BACKGROUND OF THE INVENTION

The invention relates to a method and to a device for additively manufacturing at least one component region of a component, in particular a component of a turbine or a compressor.

From the prior art, additive manufacturing methods for fast manufacturing prototypes or for manufacturing components, which are difficult to be manufactured with other methods, are known. Hereto, methods as the selective laser melting (SLM), the direct metal laser sintering (DMLS) or electron beam methods are employed among other things. From the prior art, additive manufacturing methods for manufacturing components of a fluid kinetic machine, such as for example components of an aircraft engine or a gas turbine, are in particular also known, e.g. the method described in DE 10 2009 051 479 A1 or a corresponding device for manufacturing a component of a fluid kinetic machine. In this method, by application of at least one powdery component material in layers to a component platform in the region of a building and joining area as well as by locally melting or sintering the component material in layers by means of energy supplied in the region of the building and joining area, a corresponding component is manufactured in layers. Herein, the supply of the energy is effected via at least one high-energy beam, for example by laser beams of a $CO_2$ laser, Nd:YAG laser, Yb fiber laser, diode laser or the like and/or by electron beams. For melting or sintering the component material, the at least one high-energy beam and the component platform are moved in relation to each other at least in certain areas in the form of a parallel arrangement disposed along a linear feed direction, whereby so-called exposure strips of linear melting or sintering zones in the form of a parallel arrangement arise.

SUMMARY OF THE INVENTION

It is the object of the present invention to provide a method and a device, which allow the additive manufacture of at least one component region of a component with improved texture structure.

According to the invention, the object is solved by a method as well as by a device of the present invention. Advantageous configurations with convenient developments of the invention are discussed in detail here, wherein advantageous configurations of the method according to the invention are to be regarded as advantageous configurations of the device according to the invention and vice versa.

A first aspect of the invention relates to a method for additively manufacturing at least one component region of a component, in particular a component of a turbine or a compressor. Therein, according to the invention, an improved texture structure of the manufactured component or component region is achieved in that the at least one high-energy beam and the component platform are moved in relation to each other in at least two different powder layers such that in powder layer regions, which are located above each other in lowering direction, the respective parallel arrangements of the respective powder layers are arranged at different angles to the respective linear feed direction. In other words, it is provided according to the invention that with exposure strips corresponding to each other of at least two powder layers located indirectly or directly above each other, the individual lines, from which the parallel arrangements are formed, are arranged or generated rotated in relation to each other with respect to the feed direction. Hereby, it is avoided in particularly simple and reliable manner that preferential directions form in the texture of the component material in the manufactured component or component region. Thereby, compared to the known manufacturing methods, the mechanical and the thermal resistivity of the component can be advantageously increased with otherwise identical manufacturing times and cost. Therein, the method according to the invention can basically be used for manufacturing a complete component or for manufacturing a certain component region or for repair or restoration of a component region of a component. Therein, the angle can basically be freely adjusted in terms of magnitude for each parallel arrangement or for each exposure strip and each powder layer between about 1° and about 179° with respect to the respective linear feed direction and accordingly be for example 1°, 2°, 3°, 4°, 5°, 6°, 7°, 8°, 9°, 10°, 11°, 12°, 13°, 14°, 15°, 16°, 17°, 18°, 19°, 20°, 21°, 22°, 23°, 24°, 25°, 26°, 27°, 28°, 29°, 30°, 31°, 32°, 33°, 34°, 35°, 36°, 37°, 38°, 39°, 40°, 41°, 42°, 43°, 44°, 45°, 46°, 47°, 48°, 49°, 50°, 51°, 52°, 53°, 54°, 55°, 56°, 57°, 58°, 59°, 60°, 61°, 62°, 63°, 64°, 65°, 66°, 67°, 68°, 69°, 70°, 71°, 72°, 73°, 74°, 75°, 76°, 77°, 78°, 79°, 80°, 81°, 82°, 83°, 84°, 85°, 86°, 87° 88° 89°, 90°, 91°, 92°, 93°, 94°, 95°, 96°, 97°, 98°, 99°, 100°, 101°, 102°, 103°, 104°, 105°, 106°, 107°, 108°, 109°, 110°, 111° 112° 113° 114° 115° 116° 117°, 118°, 119°, 120°, 121°, 122°, 123° 124° 125° 126° 127° 128° 129°, 130°, 131°, 132°, 133°, 134°, 135° 136° 137° 138° 139° 140° 141°, 142°, 143°, 144°, 145°, 146°, 147° 148° 149° 150° 151° 152° 153°, 154°, 155°, 156°, 157°, 158°, 159° 160° 161° 162° 163° 164° 165°, 166°, 167°, 168°, 169°, 170°, 171° 172° 173° 174° 175° 176° 177°, 178° or 179°.

In an advantageous configuration of the invention, it is provided that the at least one high-energy beam and the component platform are moved in relation to each other in at least two consecutive powder layers and/or in all of the powder layers such that in powder layer regions, which are above each other in lowering direction and adjoin to each other, the respective parallel arrangements of the respective powder layers are arranged at different angles to the respective linear feed direction. In other words, it is provided according to the invention, at least for powder layer regions located above each other in lowering direction, after manufacturing a first component layer, to vary the extension or the relative orientation of the parallel exposure lines with respect to the linear feed direction at least in the following component layer. For example, an angle of about 90° to the linear feed direction can be adjusted for the parallel arrangement of a first powder layer, while an angle of about 45° is adjusted for the following powder layer in the corresponding powder layer region. Accordingly, the angle can be varied and newly adjusted in at least one further powder layer or in all of the powder layers after each passage. Hereby, the development of preferential directions in the texture of the component is particularly reliably prevented. Therein, it can basically be provided that an individual angle is associated with each powder layer depending on the layer number.

Further advantages arise if the at least one high-energy beam and the component platform are moved in relation to each other at least in certain areas in alternating, in particular strictly alternating linear movements along at least one linear feed direction to form a parallel arrangement. In other words, it is provided that the individual straight lines or illumination lines, which together form the parallel arrangement, are generated by direction changing relative movement between the high-energy beam and the component platform. Therein, it can be provided that the direction is varied after each line, that is in strictly alternating manner, or after a preset number of lines, that is in alternating manner. Hereby, an advantageous heat distribution in the generated exposure strip and a correspondingly uniform texture formation are achieved.

In a further advantageous configuration of the invention, it is provided that the at least one high-energy beam and the component platform are moved in relation to each other in at least two different powder layers such that the respective linear feed directions are identically oriented in powder layer regions located above each other in lowering direction. In other words, the feed direction is kept constant for a certain powder layer region over two or more powder layers. Instead of rotating the exposure strip itself by varying the feed direction, thus, only the individual lines, from which the exposure strip is composed, are rotated to each other from powder layer to powder layer. Hereby, the individual component layers can be manufactured in simple and fast manner without preferential directions occurring in the material texture of the component.

Further advantages arise by inductively heating the component by means of at least one induction coil at least in certain areas and/or at least in times. This allows heating the component or the component region in specific manner and depending on material to facilitate melting or sintering, promote the formation of desired texture structures and avoid the occurrence of hot crack formation. For example, the component or the component region can be heated to a basic temperature, which is ca. 300° C. to 400° C. below a preferred melting temperature of the respective alloy or the powder.

Therein, it has further proven advantageous if the angle of at least one parallel arrangement to the associated linear feed direction is selected depending on a heating characteristic of the at least one induction coil. In other words, the exposure of one, multiple or all powder layers is adapted to the heating characteristic of the at least one induction coil. This allows particularly precise influence on the arising component texture.

In a further advantageous configuration of the invention, it is provided that the at least one high-energy beam and the component platform are moved in relation to each other in at least one powder layer such that at least two straight lines of the concerned parallel arrangement have identical and/or different lengths. This allows precise adjustment of the geometry of the exposure strip defined by the parallel arrangement depending on the respectively selected angle.

A second aspect of the invention relates to a device for additive manufacture of at least one component region of a component, in particular of a component of a turbine or a compressor. Hereto, the device includes at least one powder supply for applying at least one powder layer to a building and joining area of a component platform capable of being lowered, at least one radiation source for generating at least one high-energy beam, by means of which the powder layer can be locally melted and/or sintered in the region of the building and joining area, and a movement means, by means of which the at least one high-energy beam and the component platform can be moved in relation to each other at least in certain areas in the form of a parallel arrangement disposed along a linear feed direction. Therein, the additive manufacture of at least one component region of a component with improved texture structure is allowed according to the invention in that the movement means is formed to move the at least one high-energy beam and the component platform in relation to each other in at least two different powder layers such that the respective parallel arrangements of the concerned powder layers are arranged at different angles to the respective linear feed direction in powder layer regions, which are located above each other in lowering direction of the component platform. Further features arising herefrom and the advantages thereof can be taken from the descriptions of the first inventive aspect, wherein advantageous configurations of the first inventive aspect are to be regarded as advantageous configurations of the second inventive aspect and vice versa.

In an advantageous configuration of the invention, at least one induction coil is provided, by means of which the component can be inductively heated at least in certain areas and/or at least in times. This allows heating the component or the component region in specific manner and depending on material to facilitate melting or sintering, to promote the formation of desired texture structures and to avoid the occurrence of hot crack formation. For example, the component or the component region can be heated to a basic temperature, which is ca. 300° C. to 400° C. below a preferred melting temperature of the respective alloy or of the powder. Hereto, the at least one induction coil can be applied with alternating current, whereby a magnetic field arises, which causes eddy currents in the component, which are converted into Joule heat. The at least one induction coil itself can be cooled, for example be cooled by liquid. Furthermore, it can be provided that two or more induction coils are provided, for example to be able to specifically heat larger or geometrically complex components or component regions. In addition, the power of the induction coil(s) can be controllable and/or variable in suitable manner in that for example the frequency, with which the induction coil(s) is or are operable, can be adapted. Thereby, a very exact and defined temperature adjustment for the component to be additively manufactured is possible. Besides avoiding preferential directions in the material texture, hot crack formations can hereby also be avoided, in particular if the component or the component region is to be manufactured of materials, which are prone to crack formation. Within the scope of the present invention, each means is understood by an induction coil, which is able to generate inductive heating, thus for example independently of the number of the windings such that the induction coil can for example also be referred to as induction loop.

In a further advantageous configuration of the invention, it is provided that the at least one induction coil is disposed rotation-proof with respect to the component platform. Because the formation of preferential directions in the texture of the additively manufactured component or component region can be advantageously suppressed with the aid of the device according to the invention, rotatable induction coils and the like can be advantageously omitted. Hereby, the device can be correspondingly more inexpensively formed. Basically, it can even be provided that the induction coil(s) is or are disposed fixedly with respect to the component platform and/or a housing of the device, that is neither rotatably or translationally or otherwise movable.

A particularly reliable avoidance of preferential directions in the material texture of the component is allowed in further configuration in that the movement means is formed to adjust the angle of at least one parallel arrangement to the associated linear feed direction depending on a heating characteristic of the at least one induction coil.

In a further advantageous configuration of the invention, a control and/or regulating means is provided, which is formed to operate the movement means and/or the radiation source depending on layer information of the component region to be manufactured and/or depending on material information of the powder layer. This allows particularly precise manufacture of the component or component region. In addition, the control and/or regulating means can also be formed to control or regulate possibly present induction coil(s). A regulation can in particular be effected depending on the measurement results of a basically optional temperature sensing means. In addition, a computer program with a software code can be provided, which is adapted such that it performs a method including the method steps according to any one of claims 1 to 7 in executing by at least one processor means of the control and/or regulating means. Such a computer program can be provided on a tangible storage medium.

A third aspect of the invention relates to a component for a turbine or a compressor, which is obtainable or obtained by a method according to the first inventive aspect and/or is manufactured by means of a device according to the second inventive aspect. Thus, the component has a texture structure, which is formed at least substantially free of preferential directions. Further features arising herefrom and the advantages thereof can be taken from the descriptions of the first and the second inventive aspect. The component is in particular formed as a component for an aircraft engine.

BRIEF DESCRIPTION OF THE DRAWING FIGURES

Figure 2:
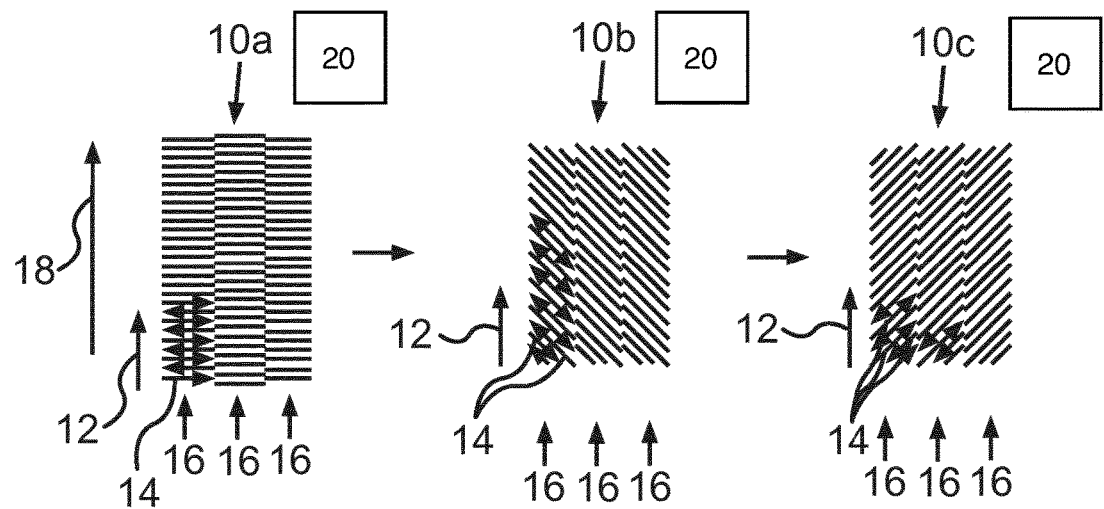

Further features of the invention are apparent from the claims, the embodiments as well as based on the drawings. The features and feature combinations mentioned above in the description as well as the features and feature combinations mentioned below in the embodiment are usable not only in the respectively specified combination, but also in other combinations without departing from the scope of the invention. There show:

FIG. 1 a schematic representation of three consecutive powder layers, which are successively impinged by a high-energy beam in a building and joining area within the scope of a method known from the prior art for additively manufacturing at least one component; and FIG. 2 a schematic representation of three consecutive powder layers, which are successively impinged by a high-energy beam in a building and joining area within the scope of a method according to the invention for additively manufacturing a component.

DESCRIPTION OF THE INVENTION

FIG. 1 shows a schematic representation of three consecutive powder layers 10a-c, which are successively impinged by at least one high-energy beam, for example a laser and/or electron beam, in a building and joining area I of a component platform of a corresponding device within the scope of a method known from the prior art for additively manufacturing at least one component of a turbine or of a compressor. Hereto, the high-energy beam is usually controlled over the powder layer 10a-c fixed with respect to the device to locally melt and/or sinter the concerned powder layer 10a-c depending on layer information of the component region to be manufactured. However, within the scope of the method according to the invention, there is basically also the possibility that the high-energy beam is generated fixedly with respect to the device by means of a radiation source and the component platform with the powder layer 10a-c applied thereon is moved in relation to the radiation source. Similarly, it can be provided that both the high-energy beam and the component platform are moved in relation to each other.

For melting and/or sintering the individual powder layers 10a-c, the high-energy beam is moved in the form of straight lines 14 disposed parallel along a linear feed direction 12 at least in certain areas in the shown example, whereby parallel arrangements 16 arise, which can also be referred to as exposure strips. Three parallel arrangements 16 or exposure strips disposed next to each other are exemplarily illustrated in number, orientation and geometry for each powder layer 10a-c, the main extension axes H of which are each disposed parallel to the feed direction 12. One recognizes that all of the straight lines 14 of the parallel arrangements 16 each have the same length and are disposed rectangularly with respect to the vector of the feed direction 12. As is further indicated by arrows, the individual straight lines 14 are generated by a strictly alternating or direction changing movement of the high-energy beam. As one further recognizes in FIG. 1, usually, the vector of the feed direction 12 is respectively rotated with respect to a fixed main axis 18 of the device for consecutive powder layers 10a-c, whereas the right angle of the straight lines 14 is kept constant with respect to the respective feed direction 12.

In contrast hereto, a schematic representation of three consecutive powder layers 10a-c is shown in FIG. 2, which are successively impinged by at least one high-energy beam in a building and joining area within the scope of a method according to the invention for additively manufacturing a component. One recognizes that unlike the method shown in FIG. 1, the at least one high-energy beam is moved over the individual powder layers 10a-c such that in the three shown powder layer regions, which are located one above the other in lowering direction of the component platform, the straight lines of the respective parallel arrangements 16 or exposure strips are each arranged at different angles to the respective linear feed direction 12. In the shown embodiment, the feed directions 12 are kept constant in contrast thereto and extend parallel to the main axis 18 of the device used for performing the method in all of the powder layers 10a-c, whereby the method can be particularly fast and simply performed. However, basically, varied angles between the feed directions 12 and the main axis 18 can also be adjusted within a powder layer 10a-c or in each new powder layer 10a-c. Instead of rotating the feed directions 12 of the parallel arrangements 16, that is the exposure strip in each powder layer 10a-c, as shown in FIG. 1, thus, only the individual lines 14, of which the individual exposure strips 16 are composed, are rotated to each other with each new powder layer 10a-c, whereby the development of preferential directions in the material texture is reliably prevented. Therein, it can be provided that a certain angle is associated with each powder layer 10a-c, such that a certain angle is respectively only once used within the additively manufactured component or component region. As one further recognizes in FIG. 2, the straight lines 14 of the three shown parallel arrangements 16 are identically oriented in each individual powder layer 10a-c. However, it can basically also be provided that the angles between the straight lines 14 of adjacent or spaced parallel arrangements 16 are differently adjusted within a single powder layer 10a, 10b and/or 10c to also particularly reliably prevent the formation of preferential directions within a powder layer 10a-c.

Furthermore, it can basically be provided that the device used for performing the method has one or more induction coils 20 for inductively heating the component or the powder layers 10a-c. Because the development of preferential directions in the texture of the component material is reliably prevented with the aid of the method according to the invention or the device according to the invention used for performing the method, the possibly present induction coils do not have to be rotatable or otherwise movable, whereby the device can be correspondingly more simply and inexpensively formed and operated.

The invention claimed is:

1. A method for additively manufacturing at least one component region of a component of a turbine or a compressor, comprising the steps of:
   a) applying a powder layer to a component platform in the at least one component region of a building and joining area;
   b) locally melting or sintering the powder layer with at least one high-energy beam that is moved, along a vector in a feed direction, in relation to the component platform in the at least one component region of the building and joining area and the at least one high-energy beam selectively impinges the powder layer in a plurality of strips that each extend parallel to the feed direction, wherein the at least one high-energy beam is moved in relation to the component platform in straight, alternating, lines along the feed direction within each of the plurality of strips to form a plurality of linear melting or sintering zones;
   c) lowering the component platform by a predetermined thickness of the powder layer in a lowering direction; and
   d) repeating the steps a) to c) to form a plurality of layers until completion of the component region,
   wherein the plurality of straight lines of one of the plurality of strips in a respective layer of the plurality of layers are arranged at an angle, with respect to the feed direction, that is different than an angle, with respect to the feed direction, of a remainder of the plurality of layers.

2. The method according to claim 1, wherein the at least one high-energy beam and the component platform are moved in relation to each other within a respective strip of the plurality of strips in strictly alternating linear movements along the linear feed direction.

3. The method according to claim 1, wherein the at least one high-energy beam and the component platform are moved in relation to each other in at least two different powder layers such that the respective linear feed directions are identically oriented in powder layer regions located above each other in a lowering direction.

4. The method according to claim 1, wherein the component is inductively heated by at least one induction coil at least in certain areas or at least in times.

5. The method according to claim 4, wherein the angle of the straight lines with respect to the linear feed direction is selected depending on a heating characteristic of the at least one induction coil.

6. The method according to claim 1, wherein the at least one high-energy beam and the component platform are moved in relation to each other in at least one powder layer such that at least two strips of the plurality of strips have identical or different lengths.

7. The method of according to claim 1, wherein the angles between the straight lines of adjacent or spaced strips, in a respective layer, are differently adjusted within the respective layer to prevent the formation of preferential directions within a powder layer.

* * * * *